United States Patent
Fu et al.

(10) Patent No.: US 10,510,340 B1
(45) Date of Patent: Dec. 17, 2019

(54) DYNAMIC WAKEWORD DETECTION

(71) Applicant: Amazon Technologies, Inc., Seattle, WA (US)

(72) Inventors: Gengshen Fu, Sharon, MA (US); Shiv Naga Prasad Vitaladevuni, Belmont, MA (US); Paul McIntyre, Melrose, MA (US); Shuang Wu, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 15/832,331

(22) Filed: Dec. 5, 2017

(51) Int. Cl.
| | | |
|---|---|---|
| *G10L 15/26* | (2006.01) | |
| *G10L 15/18* | (2013.01) | |
| *G10L 15/22* | (2006.01) | |
| *G10L 15/16* | (2006.01) | |
| *G10L 15/08* | (2006.01) | |

(52) U.S. Cl.
CPC .............. *G10L 15/18* (2013.01); *G10L 15/22* (2013.01); *G10L 15/16* (2013.01); *G10L 2015/088* (2013.01); *G10L 2015/223* (2013.01)

(58) Field of Classification Search
CPC ..... G10L 15/22; G10L 15/1815; G10L 15/20; G10L 15/26; G10L 15/32; G10L 25/87; G10L 25/063; G10L 15/08; G10L 15/222; G10L 15/30; G10L 17/06; G10L 13/08; G10L 15/02; G10L 15/04; G10L 15/10; G10L 15/16; G10L 15/265; G10L 17/02; G10L 17/05; G10L 17/00; G10L 17/18; G10L 17/22; G10L 17/04; G10L 19/08; G10L 21/0208; G10L 21/028; G10L 21/0332; G10L 25/18
USPC ....... 704/235, 270, 275, 251, 248, 253, 231, 704/243
See application file for complete search history.

(56) References Cited

U.S. PATENT DOCUMENTS

| | | | |
|---|---|---|---|
| 9,466,286 B1 | 10/2016 | Hart et al. | |
| 9,691,378 B1 * | 6/2017 | Meyers | .................. G10L 15/08 |
| 9,728,188 B1 * | 8/2017 | Rosen | ..................... G10L 15/22 |
| 9,875,081 B2 * | 1/2018 | Meyers | ................ G10L 15/063 |
| 10,074,371 B1 * | 9/2018 | Wang | ...................... G10L 15/22 |
| 10,074,634 B2 * | 9/2018 | Okumura | .............. H02M 7/003 |
| 10,079,015 B1 * | 9/2018 | Lockhart | ................ G10L 15/22 |
| 10,109,294 B1 * | 10/2018 | Ayrapetian | ............. G10L 25/78 |
| 10,186,265 B1 * | 1/2019 | Lockhart | ................ G10L 15/22 |
| 10,186,267 B1 * | 1/2019 | Devaraj | ............... H04L 67/306 |
| 10,187,503 B2 * | 1/2019 | Hart | ..................... H04M 1/271 |
| 10,192,546 B1 * | 1/2019 | Piersol | .................... G10L 25/87 |

(Continued)

*Primary Examiner* — Vijay B Chawan
(74) *Attorney, Agent, or Firm* — Pierce Atwood LLP

(57) ABSTRACT

Techniques for using a dynamic wakeword detection threshold are described. A server(s) may receive audio data corresponding to an utterance from a device in response to the device detecting a wakeword using a wakeword detection threshold. The server(s) may then determine the device should use a lower wakeword detection threshold for a duration of time. In addition to sending the device output data responsive to the utterance, the server(s) may send the device an instruction to use the lower wakeword detection threshold for the duration of time. Alternatively, the server(s) may train a machine learning model to determine when the device should use a lower wakeword detection threshold. The server(s) may send the trained machine learned model to the device for use at runtime.

20 Claims, 14 Drawing Sheets

(56) References Cited

U.S. PATENT DOCUMENTS

| | | | |
|---|---|---|---|
| 2017/0083285 A1* | 3/2017 | Meyers | G10L 15/063 |
| 2017/0090864 A1* | 3/2017 | Jorgovanovic | G06F 3/167 |
| 2017/0270919 A1* | 9/2017 | Parthasarathi | G10L 15/20 |
| 2018/0054504 A1* | 2/2018 | Hart | H04M 1/271 |
| 2018/0182389 A1* | 6/2018 | Devaraj | G10L 15/22 |

* cited by examiner

US 10,510,340 B1

DYNAMIC WAKEWORD DETECTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
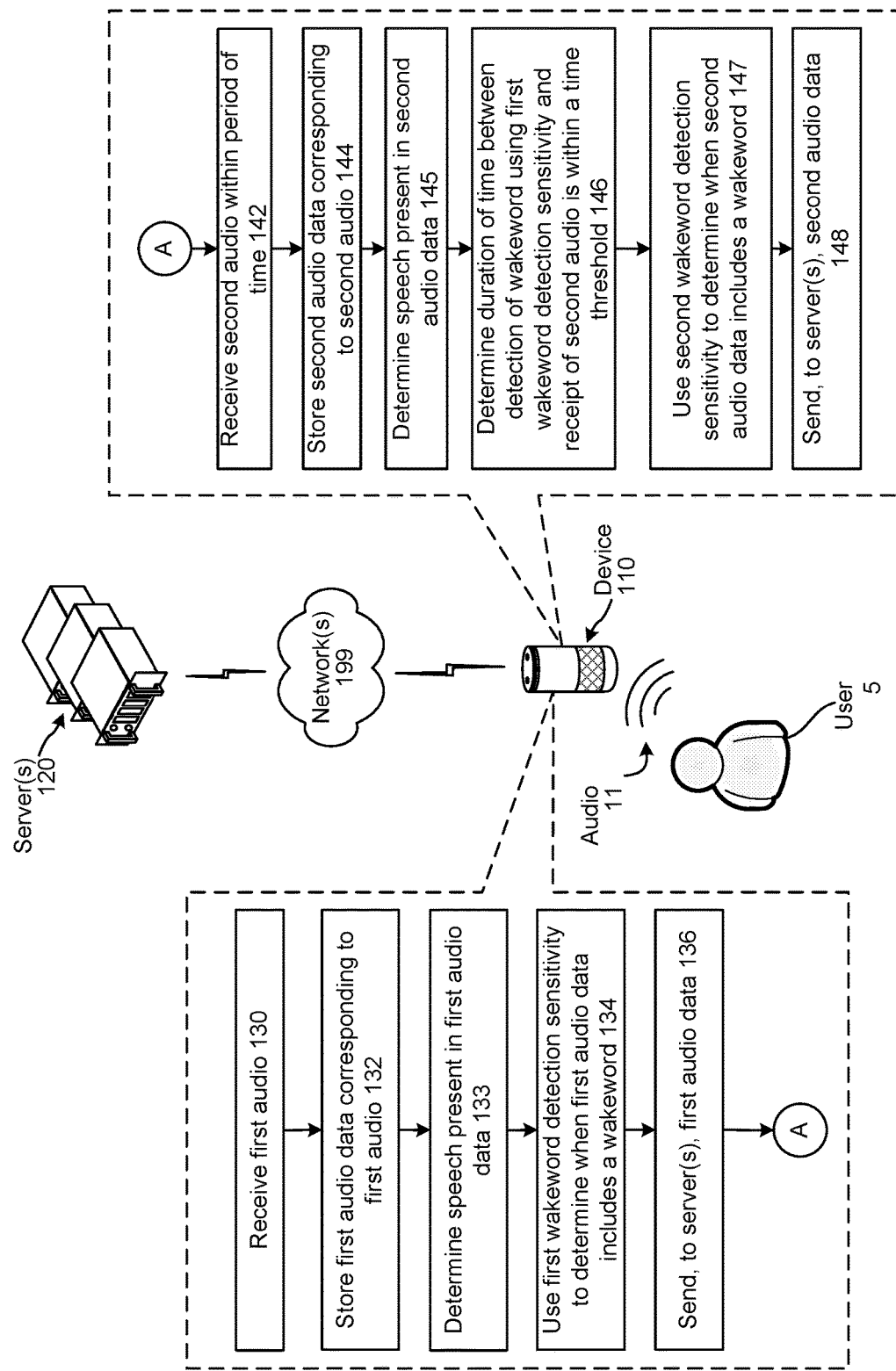
FIG. 1 illustrates a system for detecting a wakeword using different wakeword detection sensitivities at runtime according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user inputs. For example, a user may say "Alexa, get me a car." In response, the system may book the user a ride with a ride sharing service. For further example, a user may say "Alexa, what is the weather." In response, the system may output weather information corresponding to the user's geographic location.

An endpoint device, local to a user, may continuously monitor audio to detect a wakeword (e.g., "Alexa"). When the device detects a wakeword, the device may "wake" and send audio to a remote system for speech processing and a determination of output content responsive to the received audio.

To determine whether a wakeword is spoken, the device may compare the audio to a stored wakeword signature. Certain devices may use a single, consistent wakeword detection sensitivity that must be satisfied in order for the device to determine a wakeword was spoken.

Users may sometimes speak multiple, successive commands to a device. Some or all of the commands may include spoken wakewords that do not match a stored wakeword signature to a degree satisfying the single, consistent wakeword detection sensitivity. This results in the device not waking when the device otherwise should.

The present disclosure improves speech processing systems by using multiple wakeword detection sensitivities when determining whether a device detects a wakeword. A device may determine whether received audio includes a wakeword using a first wakeword detection sensitivity. If the device detects the wakeword using the first wakeword detection sensitivity, the device may attempt to detect subsequently spoken wakewords using a second, lower wakeword detection sensitivity for a period of time. Such allows a system to be more sensitive to wakeword initiated utterances that follow one another in a short time period than may be possible using a single, continuous, higher wakeword detection sensitivity.

While the present disclosure discusses adjustment of a threshold value as an example of adjustment of wakeword detection sensitivity, other sensitivity adjustment techniques may be used. For example, a first model used for wakeword detection may be trained with a first sensitivity and a second model wakeword detection may be trained with a second sensitivity which is greater than the first sensitivity, such that use of the second model by the device results in wakewords more likely being detected than use of the first model (and potentially more false positives as well). Each model may be stored with the device 110 and the device 110 may switch between models in response to a command from the server(s) 120 to operate using a particular wakeword detection sensitivity.

Another example of adjusting wakeword sensitivity may involve different audio processing by the device 110. For example, the device 110 may convert audio to audio data using one audio capture configuration which creates audio data containing certain information about detected audio. The device may also convert audio to audio data using a second audio capture configuration which creates audio data containing different information about detected audio where the different information may make it more likely that the device 110 can detect a wakeword representation using audio data created using the second configuration. The device 110 may switch between audio capture configurations in response to a command from the server(s) 120 to operate using a particular wakeword detection sensitivity.

Other techniques for adjusting wakeword sensitivity may also be used.

FIG. 1 illustrates how a device 110 may implement different wakeword detection sensitivities at runtime. Although the figures and discussion illustrate certain operational steps of the system in a particular order, the steps described may be performed in a different order (as well as certain steps removed or added) without departing from the intent of the disclosure. A device 110 local to a user 5 and one or more server(s) 120 may communicate across one or more networks 199.

The device 110 receives (130) audio 11 corresponding to the device's surroundings. The device 110 may include a microphone or microphone array that is/are enabled to continuously receive the first audio 11.

The device 110 stores (132) first audio data corresponding to the first audio 11. The device 110 may implement a rolling buffer such that first audio data is input to the rolling buffer at a rate at which first audio data is deleted from the rolling buffer.

The device 110 determines (133) whether speech is present in the first audio data. The device 110 may use various techniques to determine whether the first audio data includes speech. For example, the device 110 may apply voice activity detection (VAD) techniques executed by a VAD/beam selection component of the device 110. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the device 110 may implement a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data.

Once speech is detected in the first audio data, a wakeword detection component 1020 (illustrated in FIG. 10) of the device 110 may detect if a wakeword is represented in the first audio data. This process may also be referred to as keyword detection, with the wakeword being a specific example of a keyword. An illustrative wakeword is "Alexa."

The device 110 (namely the wakeword detection component 1020) uses (134) a first wakeword detection sensitivity to determine when the first audio data, stored in the rolling buffer, includes a wakeword (e.g., spoken by the user 5). For example, the first wakeword detection sensitivity may correspond to a first wakeword detection threshold value. The wakeword detection component 1020 may determine whether specific characteristics of the first audio data match preconfigured wakeword acoustic waveforms or a wakeword audio signature to a degree satisfying the first wakeword detection sensitivity. Once the wakeword detection component 1020 detects the wakeword using the first wakeword detection sensitivity, the device 110 may "wake" and send (136) first audio data to the server(s) 120.

The device 110 also receives (142) second audio 11 corresponding to the device's surroundings and stores (144) second audio data corresponding to the audio 11 in the rolling buffer. The device 110 determines (145) speech is present in the second audio data. Based on the device 110 determining speech is present in the second audio data, the wakeword detection component 1020 determines (146) that a duration of time between detection of the first wakeword using the first wakeword detection sensitivity and receipt of the second audio is within a time threshold. In other words, the wakeword detection component 1020 may determine a duration of time between receipt of the first audio and receipt of the second audio by the device 110 is within a certain time threshold.

If the duration of time is within a time duration threshold, the wakeword detection component 1020 uses (147) the second, lower wakeword detection sensitivity to determine when the second audio data, stored in the rolling buffer, includes a wakeword (e.g., spoken by the user 5). For example, the second wakeword detection sensitivity may correspond to a second, lower wakeword detection threshold value. Once the wakeword detection component 1020 detects the wakeword using the second wakeword detection sensitivity, the device 110 may "wake" and send (148) second audio data to the server(s) 120.

The server(s) 120 performs speech processing (e.g., ASR and NLU) on the second audio data to determine second output data responsive to an utterance represented in the second audio data received by the server(s) 120. The device 110 receives (138) the second output data from the server(s) 120 and presents (140) second output content corresponding to the second output data.

Figure 2:
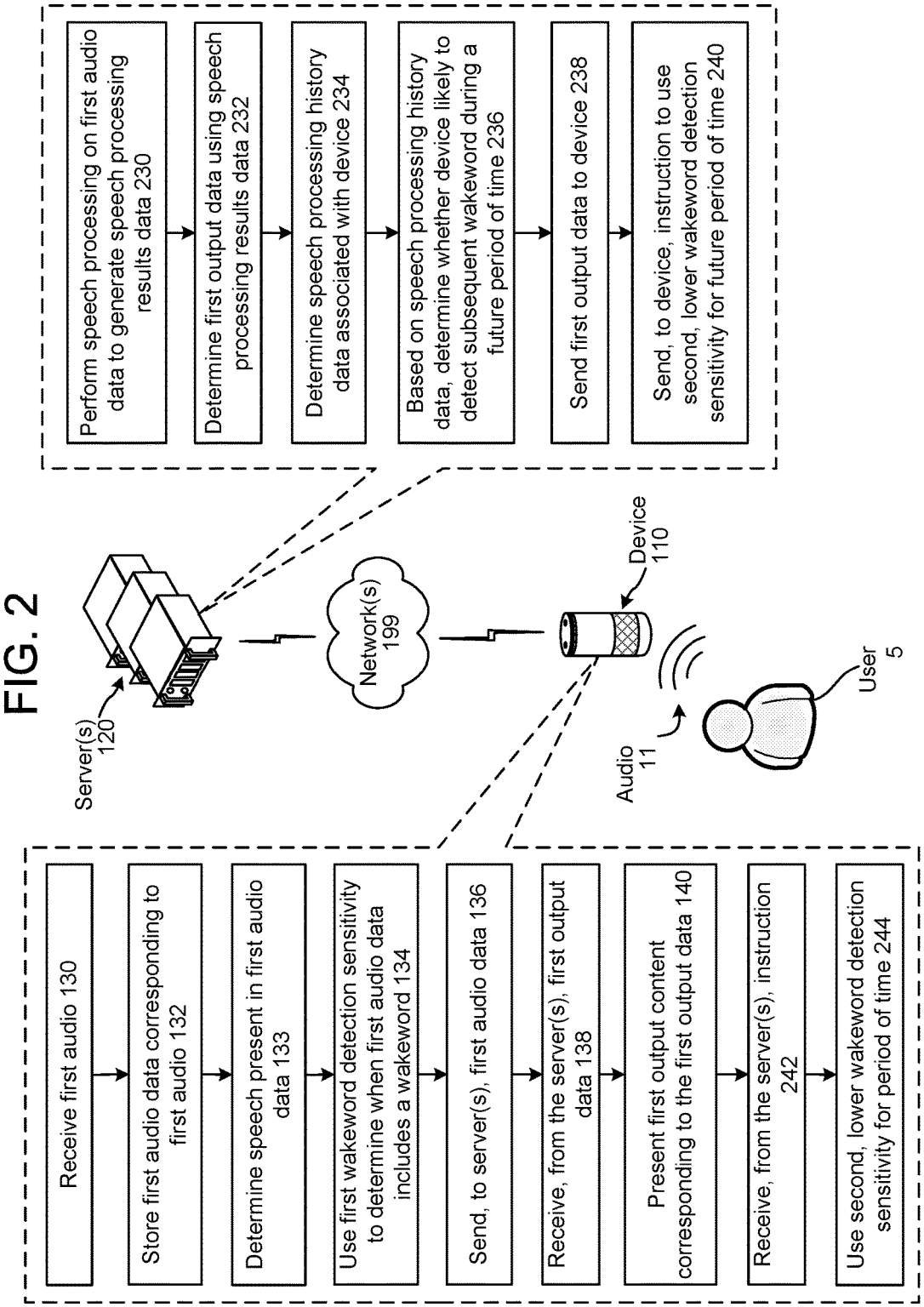
FIG. 2 illustrates a system for detecting a wakeword using different wakeword detection sensitivities at runtime according to embodiments of the present disclosure.

As described above, the device 110 may determine when to use a second, lower wakeword detection sensitivity. As illustrated, the device 110 is configured within a speech processing system including the server(s) 120. FIG. 2 illustrates the server(s) 120 may determine when the device 110 should use the second, lower wakeword detection sensitivity and instruct the device 110 accordingly, at runtime.

As illustrated in FIG. 2, the device 110 receives (130) audio 11 corresponding to the device's surroundings and stores (132) first audio data corresponding to the audio 11. The device 110 determines (133) whether speech is present in the first audio data. Once speech is detected in the first audio data, the wakeword detection component 1020 of the device 110 uses (134) a first wakeword detection sensitivity to determine when the first audio data includes a wakeword (e.g., spoken by the user 5). Once the wakeword detection component 1020 detects the wakeword using the first wakeword detection sensitivity, the device 110 may "wake" and send (136) first audio data to the server(s) 120.

The server(s) 120 performs (230) speech processing (e.g., ASR and NLU) on the first audio data to generate speech processing results data. The server(s) 120 determines (232) determines output data using the speech processing results data.

The server(s) 120 determines (234) speech processing history data associated with the device 110. Based on the speech processing history data, the server(s) 120 determines (236) whether the device 110 is likely to detect a subsequent wakeword during a future period of time (e.g., within the next 30 seconds).

The server(s) 120 sends (238) the output data to the device 110, which receives (138) the output data and presents (140) output content corresponding to the output data. If the server(s) 120 determines the device 110 is likely to detect a subsequent wakeword during a future period of time, the server(s) 120 sends (240), to the device 110, an instruction to use a second, lower wakeword detection sensitivity for the future period of time. In response to the device 110 receiving (242) the instruction, the wakeword detection component 1020 uses (244) the second, lower wakeword detection sensitivity for the period of time.

Figure 3:
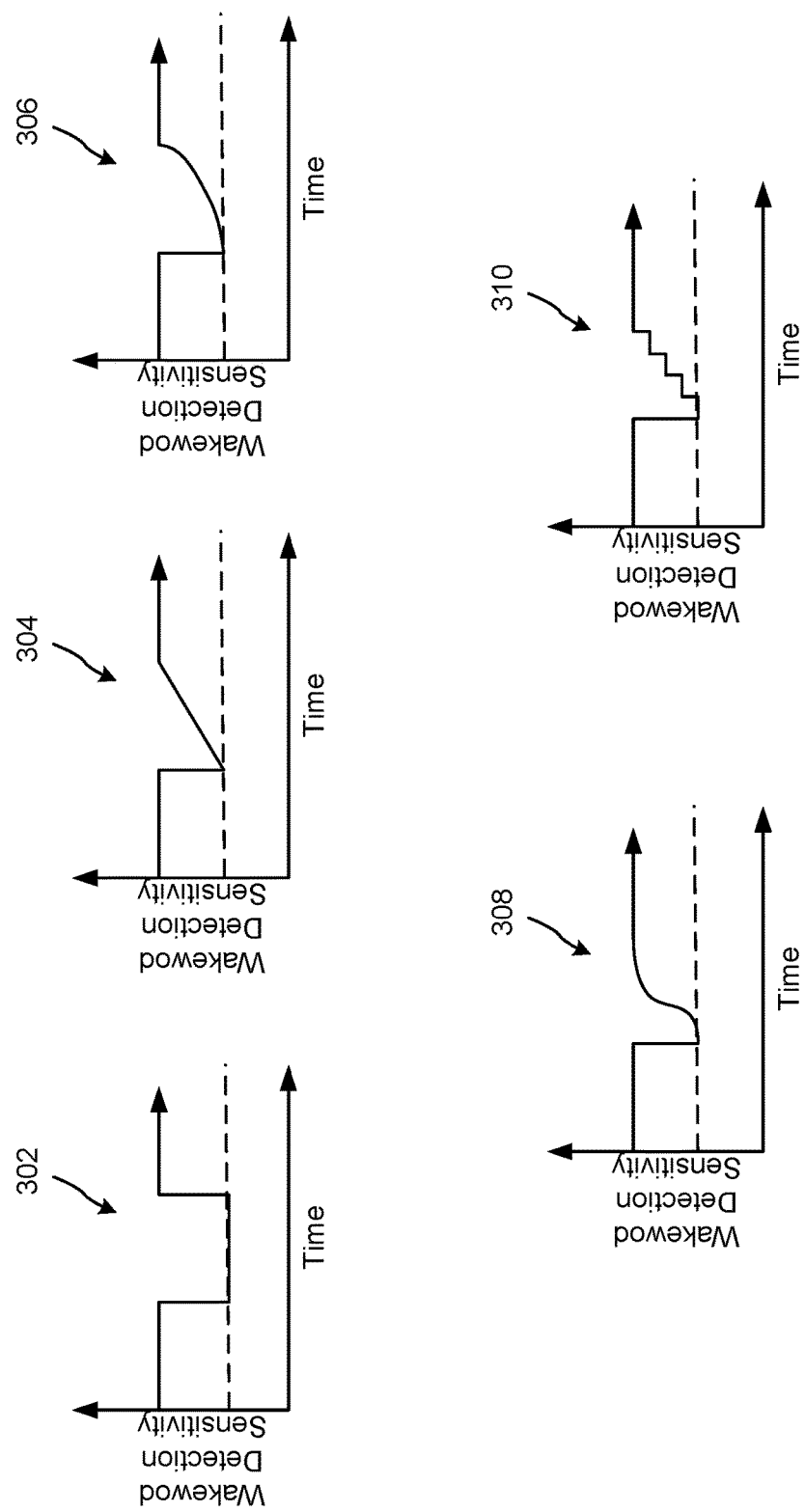
FIG. 3 illustrates several example manners in which a wakeword detection component of a device may transition between wakeword detection sensitivities at runtime according to embodiments of the present disclosure.

As described herein, the wakeword detection component 1020 may use a second, lower wakeword detection sensitivity for a period of time, as determined by either the device 110 or the server(s) 120. During the period of time, the wakeword detection component 1020 may transition the wakeword detection sensitivity from the second, lower sensitivity to the first, higher sensitivity such that the wakeword detection component 1020 is back to using the first, higher sensitivity at the end of the period of time. FIG. 3 illustrates various ways in which the wakeword detection component 1020 may transition between wakeword detection sensitivities at runtime. While FIG. 3 illustrates a single type of transition (e.g., vertical) from the first, higher wakeword detection sensitivity to the second, lower wakeword detection sensitivity, one skilled in the art will appreciate that other transitions (e.g., linearly, stair-step, etc.) from the first, higher wakeword detection sensitivity and the second, lower wakeword detection sensitivity may be possible. Moreover, while FIG. 3 illustrates separate manners (e.g., exponentially, logarithmically, linearly, etc.) in which the wakeword detection component 1020 may transition from the second, lower wakeword detection sensitivity to the first, higher wakeword detection sensitivity, one skilled in the art will appreciate that the wakeword detection component 1020 may use multiple manners to conduct a single transition from the second, lower wakeword detection sensitivity to the first, higher wakeword detection sensitivity (e.g., start with a linear transition and finish with an exponential transition, start with an exponential transition and finish with a linear transition, etc.).

FIG. 3 illustrates a graph 302 illustrating how the wakeword detection component 1020 may maintain the second, lower wakeword detection sensitivity for a duration of time. Once the period of time has elapsed, the wakeword detection component 1020 may increase the wakeword detection sensitivity. The system may transition between wakeword detection sensitivities as illustrated in graph 302 when the system does not have access to user-specific data. If the system has access to user-specific data, the system may implement transitions such as those represented in graphs 304, 306, 308, 310, or others.

FIG. 3 also illustrates a graph 304 illustrating how the wakeword detection component 1020 may, upon commencing use of (or some amount of time after commencing use of) the second, lower wakeword detection sensitivity, linearly transition (e.g., decay) from the second, lower wakeword detection sensitivity back to the first, higher wakeword detection sensitivity over a duration of time. Such a transition from the second sensitivity to the first sensitivity may be used when the device 110 or server(s) 120 determines, with less than optimal confidence, that the device 110 will receive audio corresponding to a subsequent wakeword.

FIG. 3 also illustrates a graph 306 illustrating how the wakeword detection component 1020 may, upon commencing use of (or some time after commencing use of) the second, lower wakeword detection sensitivity, exponentially transition (e.g., decay) from the second, lower wakeword detection sensitivity back to the first, higher wakeword detection sensitivity over a duration of time. Such a transition from the second sensitivity to the first sensitivity may be used when the device 110 or server(s) 120 determines the device 110 will receive audio corresponding to a subsequent wakeword, but that the device 110 is exponentially less likely to receive such audio towards the end of the duration of time. Such a determination may be made by a trained model operated by the device 110 or using a different technique.

FIG. 3 also illustrates a graph 308 illustrating how the wakeword detection component 1020 may, upon commencing use of (or some time after commencing use of) the second, lower wakeword detection sensitivity logarithmically transition (e.g., decay) from the second, lower wakeword detection sensitivity back to the first, higher wakeword detection sensitivity over a duration of time. Such a transition from the second sensitivity to the first sensitivity may be used when the device 110 or server(s) 120 determines the device 110 will receive audio corresponding to a subsequent wakeword, but that the device 110 is exponentially and then logarithmically less likely to receive such audio. Such a determination may be made by a trained model operated by the device 110 or using a different technique.

FIG. 3 also illustrates a graph 310 illustrating how the wakeword detection component 1020 may use the second, lower wakeword detection sensitivity for a first amount of time and then transition (e.g., decay) from the second, lower wakeword detection sensitivity back to the first, higher wakeword detection sensitivity over a duration of time in a stair-step manner. Such a transition from the second sensitivity to the first sensitivity may be used when the device 110 or server(s) 120 determines different spans of time over the duration of time in which the device 110 will receive audio corresponding to a subsequent wakeword with decreasing likelihood. Such a determination may be made by a trained model operated by the device 110 or using a different technique. The transition from the second wakeword detection sensitivity to the first wakeword detection sensitivity as illustrated in graph 310 may also be used when the system has a limited amount of input data such that the system does not have enough confidence to use other forms of transitions.

The device 110 may determine a likelihood that the device 110 will detect a subsequent utterance within a duration of time of detecting the first wakeword. Therefrom, the device 110*a* may determine the second, lower wakeword detection sensitivity. The device 110 may implement one or more trained models, trained using various data detailed herein, to determine the likelihood. A magnitude of the second wakeword detection sensitivity (e.g., a value between the first wakeword detection sensitivity and the second wakeword detection sensitivity) may depend on the determined likelihood. For example, the greater the determined likelihood, the lower the second wakeword detection sensitivity. The server(s) 120 may alternatively determine the aforementioned and send an indication of such to the device 110.

Figure 4:
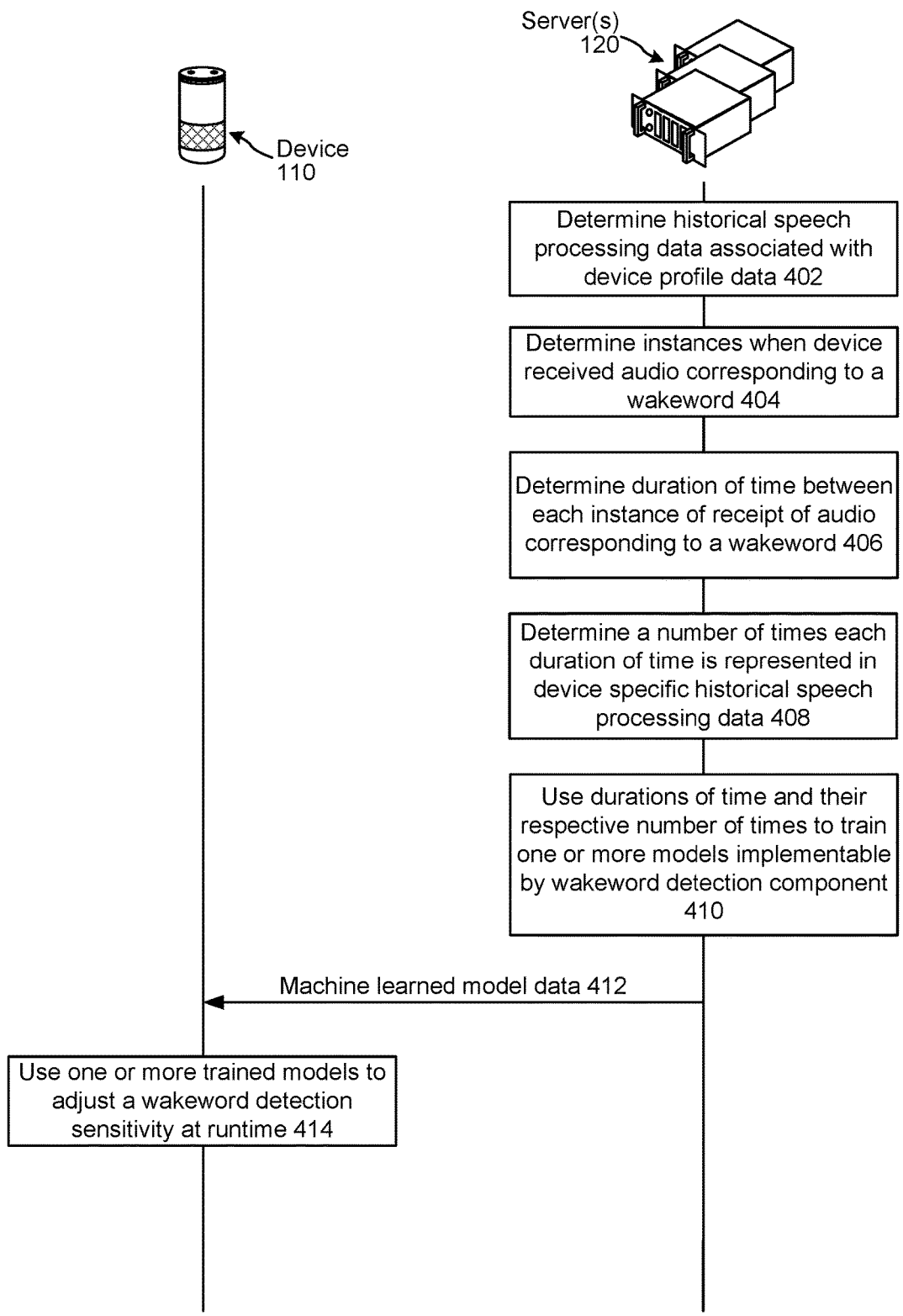
FIG. 4 is a signal flow diagram illustrating how, during a training period, a server(s) may use device speech processing data to generate a machine learned model(s) for transitioning between wakeword detection sensitivities at runtime according to embodiments of the present disclosure.

The device 110 may be configured to determine when to use the second, lower wakeword detection sensitivity. Such determination may be based on the device 110 implementing a trained model(s) received from the server(s) 120. The server(s) 120 may train one or more machine learning models using speech processing data and may send the trained model(s) to the device 110 such that the device 110 may implement (without needing to train) the model(s). FIG. 4 illustrates how the server(s) 120 may use device specific speech processing data to train a machine learning model(s) for transitioning between wakeword detection sensitivities, which the wakeword detection component 1020 of the device 110 may implement at runtime. The device specific speech processing data may be associated with multiple users such that a model trained therefrom is specific to the device and not any particular user.

As illustrated in FIG. 4, the server(s) 120 determines (402) historical speech processing data associated with device profile data associated with the device 110. For example, at different points in time (e.g., once a week, once every two weeks, once a month, etc.), the server(s) 120 may determine the device profile data of the device 110 and determine speech processing data associated therewith or represented therein.

Historical speech processing data as used herein may include ASR processing results, NLU processing results (including determined intents, resolved slots, etc.), etc. In addition, historical speech processing data may include data received from a speechlet component 1090 in response to the speechlet component 1090 being called to execute with respect to NLU results data.

Device profile data represents a profile specific to a device. For example, device profile data may represent various user profiles that are associated with the device, speech processing that was performed with respect to audio data received from the device, instances when the device detected a wakeword, etc. In contrast, user profile data represents a profile specific to a user. For example, user profile data may represent various devices associated with the user, etc.

The speech processing data may represent previous instances in time when the device 110 detected a wakeword and sent the server(s) 120 input data for processing. The speech processing data may correspond to all previous instances in time in which the device 110 detected a wakeword and sent the server(s) 120 input data for processing, or a portion thereof (e.g., a previous month, previous two weeks, previous week, etc.). When the device 110 sends the server(s) 120 input data for processing, the device 110 may also send the server(s) 120 data representing a time stamp corresponding to a time when the device 110 detected a wakeword associated with the input data. Thus, the speech processing data may indicate discrete points in time in which the device 110 previously detected wakewords.

Using the historical speech processing data, the server(s) 120 determines (404) instances when the device 110 received audio corresponding to a wakeword. The server(s) 120 may also determine (406) a duration of time between each instance of receipt of audio corresponding to a wakeword. The server(s) 120 may also determine (408) a number of times each duration is represented in the device specific historical speech processing data. The server(s) 120 uses (410) the determined durations of time and their respective number of times they are represented in the device specific speech processing data to train one or more machine learning models.

The server(s) 120 sends (412), to the device 110, machine learned model data representing the one or more device specific trained models. The server(s) 120 may send the machine learned model data to the device 110 during a software update (or using some other non-runtime data transmission functionality).

During runtime, the wakeword detection component 1020 may use (414) one or more trained models (trained according to process 408) to adjust the wakeword detection sensitivity used to detect a wakeword in audio data. Thus, at runtime, the wakeword detection component 1020 may receive audio data, process the audio data using the trained model(s), and output an indicator when the wakeword detection component 1020 detects a wakeword in audio data using the trained model(s).

The aforementioned models and other models described herein, which are implemented by components of the system may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
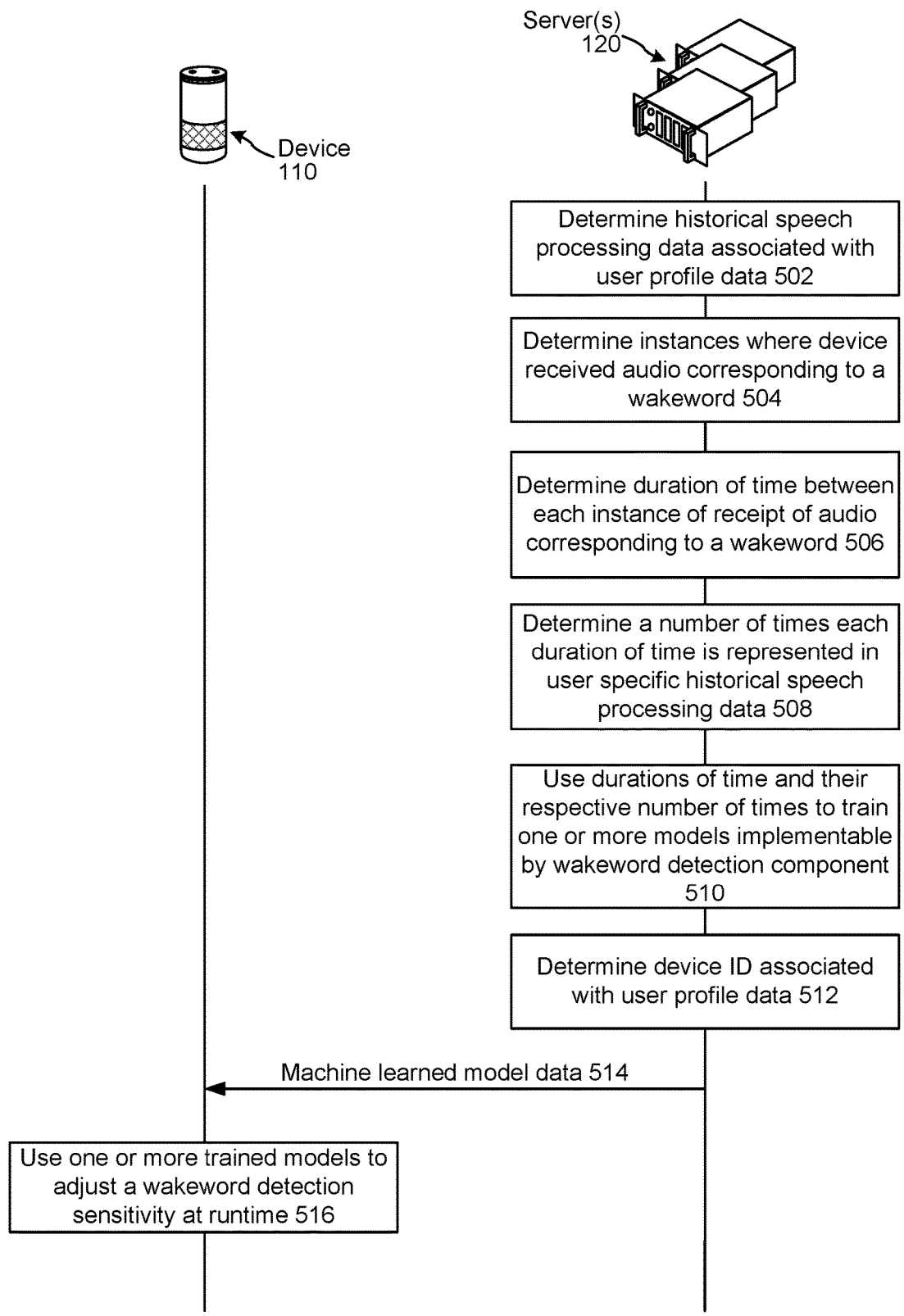
FIG. 5 is a signal flow diagram illustrating how, during a training period, a server(s) may use user specific speech processing data to generate a machine learned model(s) for transitioning between wakeword detection sensitivities at runtime according to embodiments of the present disclosure.

Described above are processes that may be performed to train a wakeword detection machine learning model(s) with respect to device specific speech processing data. FIG. 5 illustrates how the server(s) 120 may use user specific speech processing data to train a machine learning model(s) for transitioning between wakeword detection sensitivities, which the wakeword detection component 1020 of the device 110 may implement at runtime. The user specific speech processing data may be associated with multiple devices used by the user such that a model trained therefrom is specific to the user and not any particular device.

As illustrated in FIG. 5, the server(s) 120 determines (502) historical speech processing data associated with user profile data associated with a user. For example, at different points in time (e.g., once a week, once every two weeks, once a month, etc.), the server(s) 120 may determine the user profile data and determine speech processing data associated therewith or represented therein.

The speech processing data may represent previous instances in time when a device of the system detected a wakeword and sent the server(s) 120 input data for processing, and the server(s) 120 determined (using a user recognition component 1095 described herein below) the user spoke the wakeword or another utterance represented in the input data. The speech processing data may correspond to all previous instances in time in which the server(s) 120 determined the user spoke an utterance represented in data received from a device, or a portion thereof (e.g., a previous month, previous two weeks, previous week, etc.). When a device sends the server(s) 120 input data for processing, the device may also send the server(s) 120 data representing a time stamp corresponding to a time when the device detected a wakeword associated with the input data. Thus, the speech processing data may indicate discrete points in time in which the user previously spoke a wakeword.

Using the speech processing data, the server(s) 120 determines (504) instances where the user previously spoke wakewords to the system. The server(s) 120 may also determine (506) a duration of time between each instance of receipt of audio corresponding to a wakeword. The server(s) 120 may also determine (508) a number of times each duration is represented in the user specific historical speech processing data. The server(s) 120 uses (510) the determined durations of time and their respective number of times they are represented in the user specific historical speech processing data to train one or more machine learning models.

The server(s) 120 determines (512) the device 110, as well as potentially other devices, associated with or represented in the user profile data. The server(s) 120 sends (514) the user specific speech processing data to the device 110, as well as potentially other devices. The server(s) 120 may send the speech processing data to the device 110 during a software update (or using some other non-runtime data transmission functionality).

During runtime, the wakeword detection component 1020 may uses (516) one or more trained models (trained according to process 510) to adjust the wakeword detection sensitivity used to detect a wakeword in audio data.

As described with respect to and illustrated in FIG. 5, the server(s) 120 may train the model(s) and send same to the device 110 for implementation at runtime. However, one skilled in the art will appreciate that in certain instances the device 110 may be configured to receive the speech processing data from the server(s) 120 as well as perform the processes of 504-510.

As described with respect to FIG. 5, the wakeword detection component 1020 may implement one or more trained models trained using user specific speech processing data. A wakeword detection component 1020 may be configured with trained models trained with respect to respective users. Thus, the device 110 may need to perform user recognition processing to determine a current user, and send an indication of same to the wakeword detection component 1020 so the wakeword detection component can implement one or more trained models trained with respect to the current user.

As described above, the wakeword detection component 1020 may implement device specific and/or user specific machine learned models. However, one skilled in the art will appreciate that one or more machine learned models may be trained using both device specific speech processing data and user specific speech processing data. The more data types used to train a machine learning model, the more accurate a resulting trained model will be in predicting whether the wakeword detection sensitivity should be lowered. For example, other data that may be used to train a machine learning model includes a type of the device 110, a location of the device 110 (e.g., a geographic location or a location with a building), etc.

As described herein, the wakeword detection component 1020 may take as input audio data. The wakeword detection component 1020 may also take as input other data, such as a number of humans detected by the device 110. The device 110 may determine a number of humans by determining different human speech within audio data corresponding to received audio. The device 110 may also determine a number of humans by capturing at least one image and processing image data corresponding to the at least one image to determine representations corresponding to human shapes.

As described herein above, the wakeword detection component 1020 may implement one or more trained models to determine when to adjust a wakeword detection sensitivity. The wakeword detection component 1020 may alternatively or also be configured to adjust a wakeword detection sensitivity in response to the device 110 receiving an instruction to do so from the server(s) 120. This allows the server(s) 120 to have greater control over wakeword detection performed by endpoint devices associated with the server(s) 120.

As described with respect to and illustrated in FIGS. 4 and 5, the server(s) 120 may train the model(s) and send same to the device 110 for implementation at runtime. However, one skilled in the art will appreciate that in certain instances the device 110 may be configured to receive historical speech processing data from the server(s) 120 as well as perform the processes to train a model(s).

Figure 6:
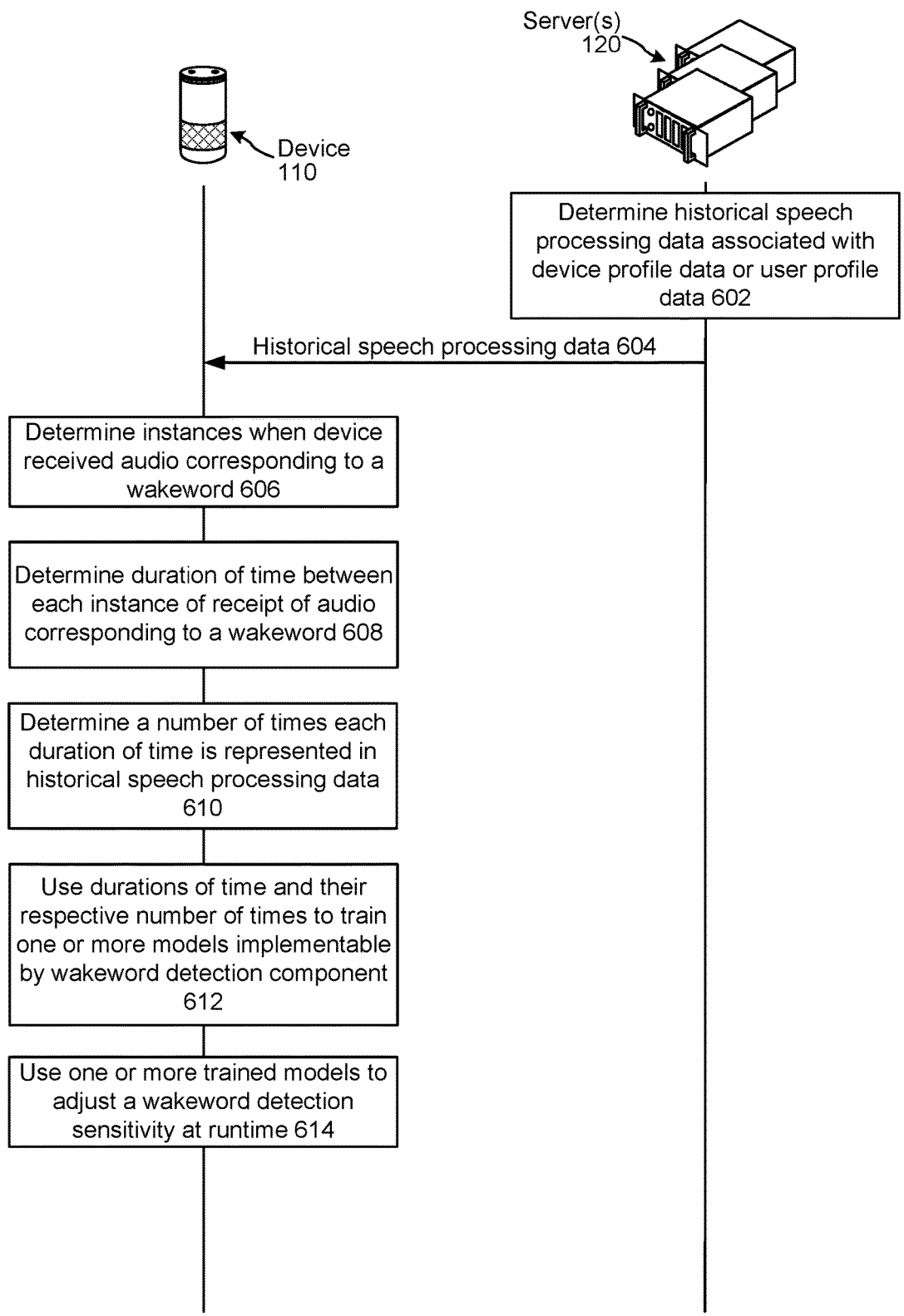
FIG. 6 is a signal flow diagram illustrating how, during a training period, a user device may use historical speech processing data to generate a machine learned model(s) for transitioning between wakeword detection sensitivities at runtime according to embodiments of the present disclosure.

FIG. 6 illustrates an example where the device 110 performs processes to train a model(s). As illustrated in FIG. 6, the server(s) 120 determines (602) historical speech processing data associated with device profile data and/or user profile data. The server(s) 120 sends (604) the historical speech processing data to the device 110. Using the historical speech processing data, the device 110 determines (606) instances when the device 110 received audio corresponding to a wakeword. Using the historical speech processing data, the device 110 may also determine (608) a duration of time between each instance of receipt of audio corresponding to a wakeword. The device 110 may also determine (610) a number of times each duration is represented in the historical speech processing data. The device 110 uses (612) the determined durations of time and their respective number of times they are represented in the historical speech processing data to train one or more machine learning models, which the device 110 uses (614) at runtime.

Alternatively, the server(s) 120 may perform some initial processing with respect to historical speech processing data and send the results of the processing to the device 110, which the device 110 uses to train a model(s). For example, the server(s) 120 could perform steps 602 and 606 and the device 110 could perform steps 608-612, the server(s) 120 could perform steps 602 and 606-608 and the device 110 could perform step 610-612, etc.

A wakeword detection model(s) trained by the device 110 may be simpler than a wakeword detection model(s) that is trained by the server(s) 120 and pushed to the device 110 since training data available to the device 110 may be more limited than training data available to the server(s) 120. For example, the device 110 may be limited to training data corresponding to time between detections of wakewords whereas the server(s) 120 may additionally have access to user-specific training data.

The data that may be used to train a model(s) as well as input to a model(s) at runtime may vary depending on the system. The data may include a duration of time between a audio streams (e.g., duration of time between previous detection of a wakeword and a current time, duration of time between different audio data transmissions from the device 110 to the server(s) 120 in response to detections of wakewords).

Figure 7:
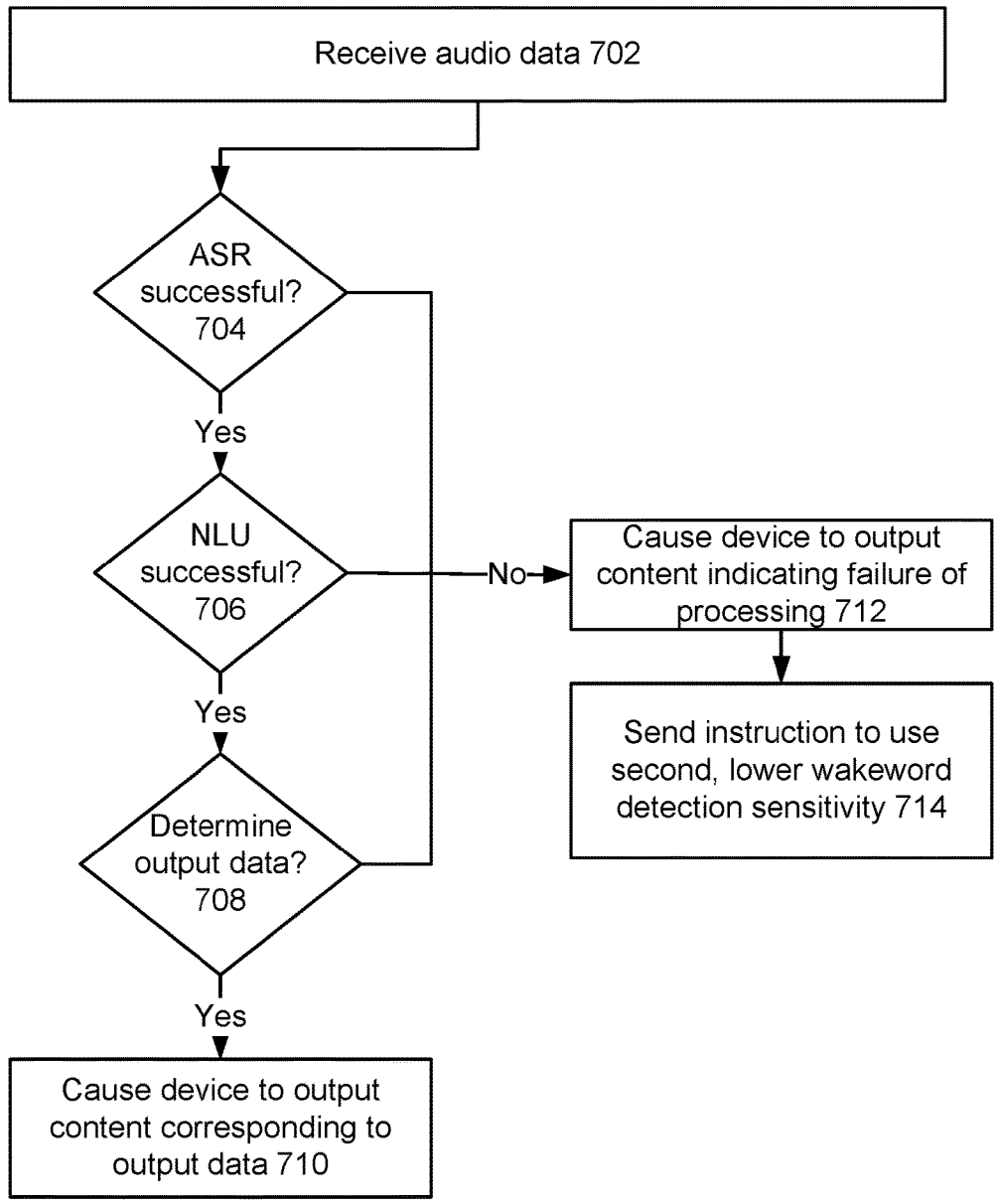
FIG. 7 is a process flow diagram illustrating how a system may determine when to adjust a wakeword detection sensitivity based on the system being unable to process current input data and without using a trained model according to embodiments of the present disclosure.

FIG. 7 illustrates how a system may determine when to adjust a wakeword detection sensitivity based on the system being unable to process current input data and without using a trained model. In response to the wakeword detection component 1020 detecting a wakeword in audio data (using either the first, higher wakeword detection sensitivity or the second, lower wakeword detection sensitivity), the server(s) 120 receives (702) audio data from the device 110. The server(s) 120 attempts (704) to perform ASR on the audio data to generate text data. If the server(s) 120 is successful in performing ASR, the server(s) 120 attempts (706) to perform NLU on the text data to generate NLU results data. If the server(s) 120 is successful in performing NLU, the server(s) 120 attempts (708) to determine output data based on the NLU results data. If the server(s) 120 is successful in determining output data, the server(s) 120 causes (710) the device 110 to output content corresponding to the output data.

The server(s) 120 may determine output data using a speechlet. A "speechlet" may be software running on the server(s) 120 that is akin to an application. That is, a speechlet may enable the server(s) 120 to execute specific functionality in order to provide data or produce some other output requested by a user. The server(s) 120 may be configured with more than one speechlet. For example, a weather speechlet may enable the server(s) 120 to provide weather information, a ride sharing speechlet may enable the server(s) 120 to book a trip with respect to a taxi or ride sharing service, an food order speechlet may enable the server(s) 120 to order a pizza with respect to a restaurant's online ordering system, etc.

Alternatively, if the server(s) 120 is unsuccessful in performing ASR, performing NLU, or determining output data (e.g., a speechlet indicates it cannot provide content based on NLU results data), the server(s) 120 may cause (712) the device 110 to output content indicating the failed processing. When the device 110 outputs such content, it may be expected that the device 110 will, shortly thereafter, receive further audio corresponding to a wakeword followed by a command. Thus, as well as causing the device 110 to output the content indicating the failed processing, the server(s) 120 may also send (714), to the device 110, an instruction to use the second, lower wakeword detection sensitivity for a period of time, with the period of time correspond to a likely period of time when the wakeword detection component 1020 will detect another wakeword in audio data.

Users may routinely speak a first wakeword followed by a first command to a device and thereafter speak a second wakeword followed by a second command to the device. Moreover, an intent of the first command may indicate to the system that the device is likely to receive the second wakeword and second command. For example, a user may routinely say "Alexa, play [artist name]," with "Alexa" corresponding to a first wakeword and "play [artist name]" corresponding to a <PlayMusic> intent. After a user speaks such, it may be routine that the user says "Alexa, [increase or decrease] the volume," with "Alexa" corresponding to a second wakeword and "play [increase or decrease] the volume" corresponding to a <ChangeVolume> intent. Since the user routinely speaks the command corresponding to the <ChangeVolume> intent after the user speaks the command corresponding to the <PlayMusic> intent, the system may infer that the wakeword detection sensitivity should be lowered when the system determines a command corresponding to a <PlayMusic> intent.

Figure 8:
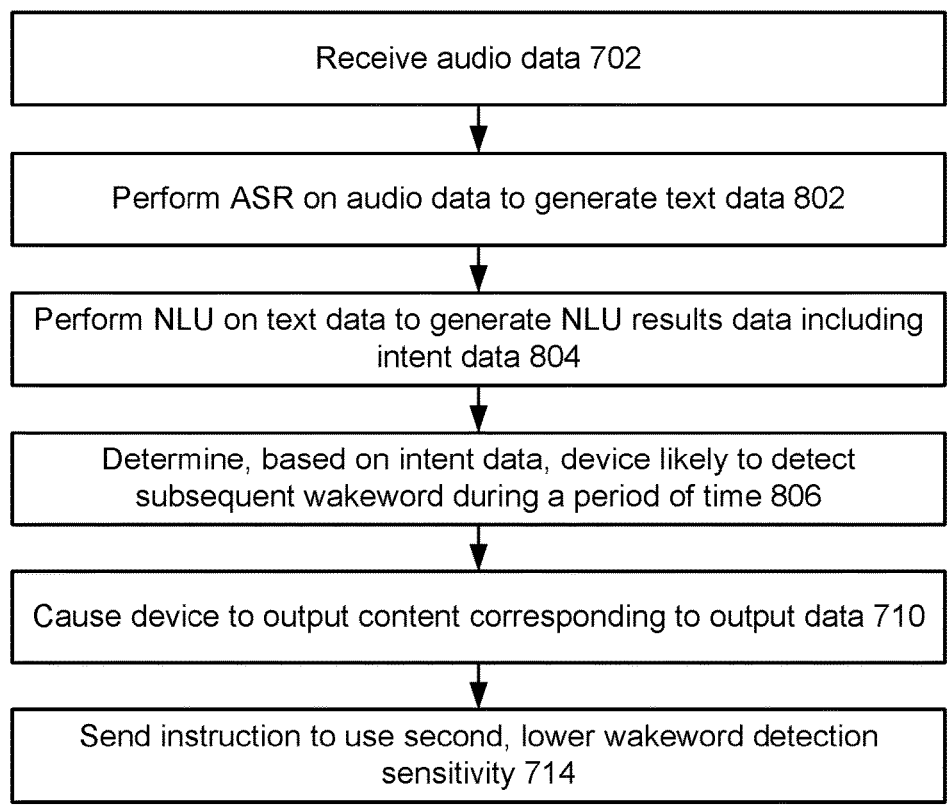
FIG. 8 is a process flow diagram illustrating how a system may determine, without using a trained model, when to adjust a wakeword detection sensitivity based on the system determining a command corresponding to a particular intent according to embodiments of the present disclosure.

FIG. 8 illustrates how a system may determine when to adjust a wakeword detection sensitivity based on the system determining a particular intent and without using a trained model. In response to the wakeword detection component 1020 detecting a wakeword in audio data (using either the first, higher wakeword detection sensitivity or the second, lower wakeword detection sensitivity), the server(s) 120 receives (702) audio data from the device 110. The server(s) 120 performs (802) ASR on the audio data to generate text data. The server(s) 120 performs (804) NLU on the text data to generate NLU results data including intent data representing an intent. An intent is an action that the user desires the system perform, such as play music, order a ride, order a pizza, etc. The server(s) 120 determines (806), using a trained model(s) (e.g., trained using historical speech processing data including intent data and response data) and based on the intent represented in the present intent data and potentially data responsive to the present intent, that the device 110 is likely to detect a subsequent wakeword during a period of time. The server(s) 120 causes (710) the device 110 to output content corresponding to output data. After the server(s) 120 determines the device 110 is likely to detect a subsequent wakeword, the server(s) 120 sends (714), to the device 110, an instruction to use the second, lower wakeword detection sensitivity for the period of time.

Figure 9:
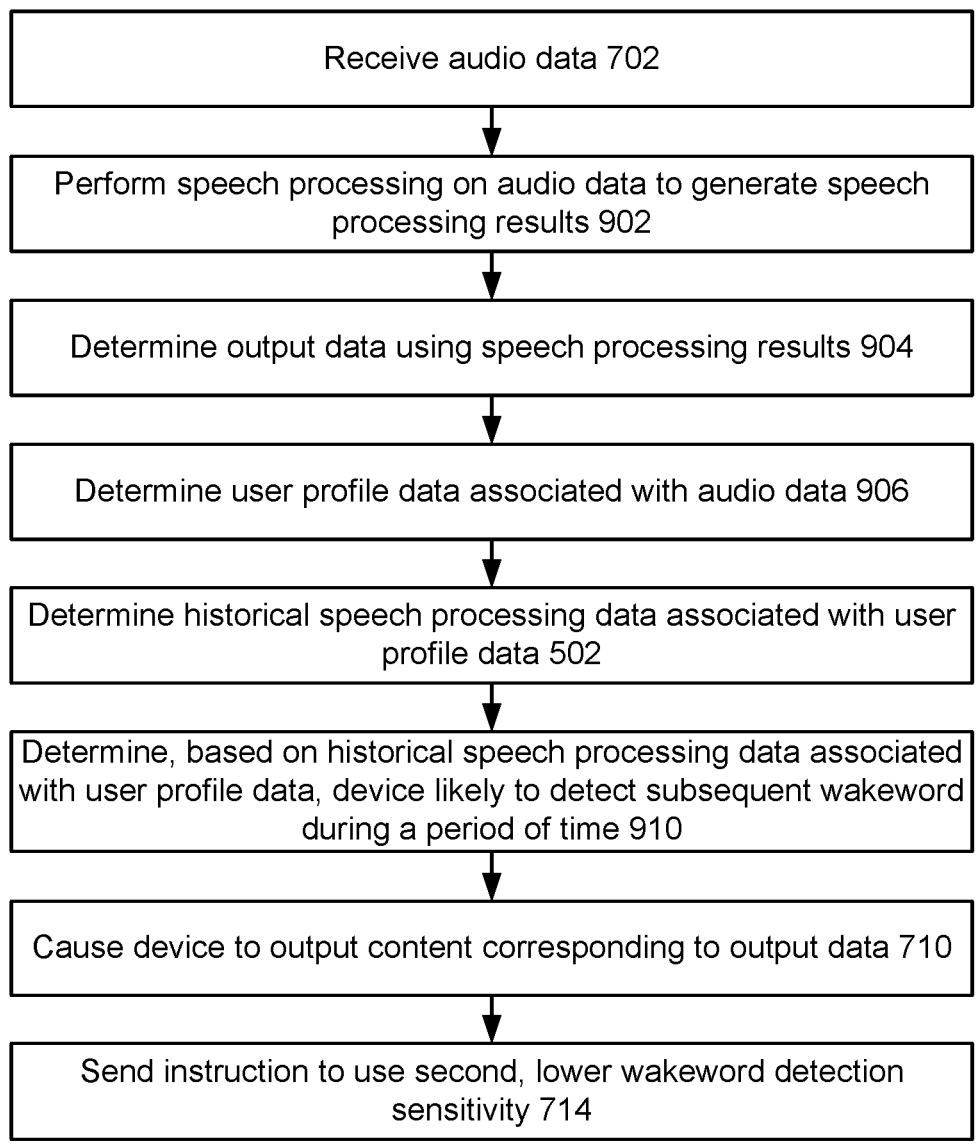
FIG. 9 is a process flow diagram illustrating how a system may determine, without using a trained model, when to adjust a wakeword detection sensitivity based on a current user according to embodiments of the present disclosure.

Each user of the system may interact with the system is specific ways. For example, a user may routinely speak back-to-back inputs to the device 110 at a particular time of day. For further example, a user may routinely speak back-to-back inputs to the device 110 when the first input corresponds to a particular intent. FIG. 9 illustrates how the server(s) 120 may determine, without using a trained model, when to cause the wakeword detection component 1020 to adjust a wakeword detection sensitivity based on a current user.

As illustrated in FIG. 9, the server(s) 120 receives (702) audio data from the device 110. The server(s) 120 performs (902) speech processing on the audio data to generate speech processing results. The server(s) 120 also determines (904) output data using the speech processing results.

The server(s) 120 determines (906) user profile data associated with the audio data. The server(s) 120 may use the user recognition component 1095 and the processes described therewith to determine the user profile data. The server(s) 120 determines (502) historical speech processing data associated with the user profile data. The server(s) 120 determines (910) whether the device 110 is likely to detect a subsequent wakeword based on the historical speech processing data associated with the user profile data and/or the speech processing data (e.g., intent data) generated based on the audio data.

The server(s) 120 causes (710) the device 110 to output content corresponding to output data. If the server(s) 120 determines the device 110 is likely to detect a subsequent wakeword, the server(s) 120 sends (714), to the device 110, an instruction to use the second, lower wakeword detection sensitivity for the period of time.

As described herein above, the device 110 or the server(s) 120 may determine a duration of time that the second, lower wakeword detection sensitivity should be used. The device 110 or server(s) 120 may also determine a future point in time when the duration of time should be commenced. Such future point in time may be measured from when the previous wakeword was detected using the first, higher wakeword detection sensitivity. The future point in time may be determined based on the current intent. For example, users may routinely say "Alexa, play [artist name]" an average amount of time prior to saying "Alexa, [increase or decrease] the volume." Thus, the future point in time when the second wakeword detection sensitivity may be determined to commence when a user would be expected to speak "Alexa" with respect to the volume change command.

In some implementations, the server(s) 120 may receive input audio data from the device 110 as well as receive an indication from the device 110 that the device 110 detected a wakeword. The server(s) 120 may perform processes to determine if a wakeword is present in the input audio data using a model trained using data accessible to the server(s) 120. This may be beneficial if the device 110a performs unreliable wakeword detection or less reliable wakeword detection than the server(s) 120.

Figure 10:
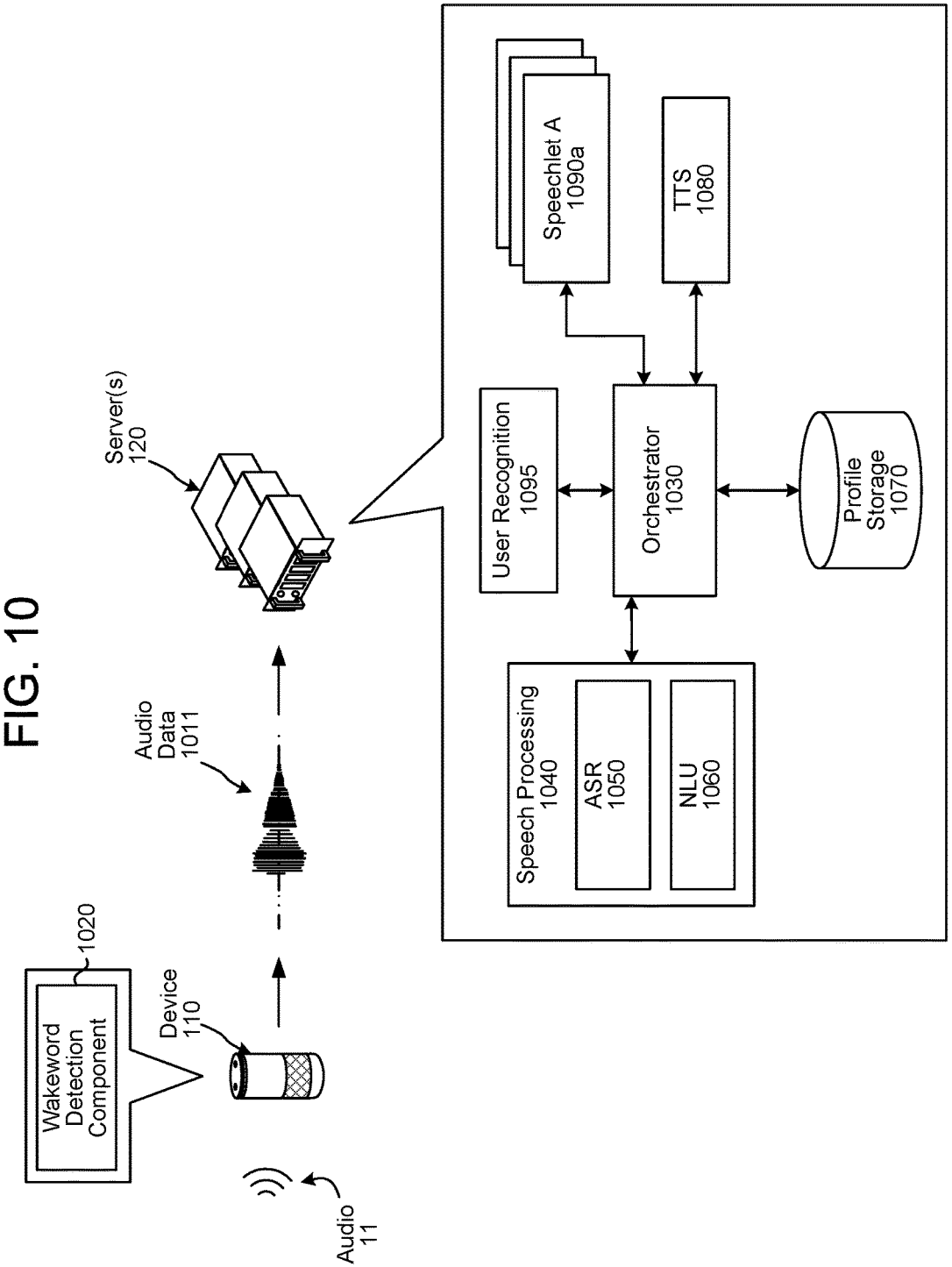
FIG. 10 is a conceptual diagram of components of a system according to embodiments of the present disclosure.

The system may operate using various components as described in FIG. 10. The various components may be located on a same or different physical devices. Communication between various components may occur directly or across a network(s) 199.

The device 110 may receive audio 11 using an audio capture component, such as a microphone or array of microphones. The device 110 may use VAD techniques to determine if audio data, corresponding to the audio 11, includes speech. If the device 110 determines the audio data includes speech, the wakeword detection component 1020 processes the audio data to determine if a wakeword is represented therein. Following detection of a wakeword, the device 110 sends audio data 1011, corresponding to at least an utterance following the wakeword in the audio data, to the server(s) 120.

The wakeword detection component 1020 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM involved. Such wakeword detection component 1020 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the server(s) 120, the audio data 1011 may be sent to an orchestrator component 1030. The orchestrator component 1030 may include memory and logic that enables the orchestrator component 1030 to transmit various pieces and forms of data to various components of the system.

The orchestrator component 1030 sends the audio data 1011 to a speech processing component 1040. An ASR component 1050 of the speech processing component 1040 transcribes the audio data 1011 into text data representing one more hypotheses representing speech contained in the audio data 1011. The ASR component 1050 interprets the utterance in the audio data 1011 based on a similarity between the utterance and pre-established language models. For example, the ASR component 1050 may compare the audio data 1011 with models for sounds (e.g., subword units, such as phonemes, etc.) and sequences of sounds to identify words that match the sequence of sounds spoken in the utterance represented in the audio data 1011. The ASR component 1050 sends (either directly or via the orchestrator component 1030) the text data generated thereby to an NLU component 1060 of the speech processing component 1040. The text data output by the ASR component 1050 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 1060 attempts to make a semantic interpretation of the phrases or statements represented in the text data input thereto. That is, the NLU component 1060 determines one or more meanings associated with the phrases or statements represented in the text data based on individual words represented in the text data. The NLU component 1060 determines an intent (e.g., a system action that a user desires the system to perform) representative of text data as well as pertinent pieces of information in the text data that allow a device (e.g., the device 110, the server(s) 120, etc.) to execute the intent. For example, if the text data corresponds to "play Adele," the NLU component 1060 may determine a user intended the system to output Adele music, which the NLU component 1060 determines is represented by a <PlayMusic> intent.

The orchestrator component 1030 (or another component of the server(s) 120) sends NLU results data a speechlet component 1090 associated with the intent. The speechlet component 1090 determines output data based on the NLU results data. For example, if the NLU results data includes intent data corresponding to <PlayMusic> and tagged text corresponding to <Artist: Adele>, the orchestrator 1030 (or other component of the server(s) 120) may send the NLU results data to a music speechlet component, which determines Adele music audio data for output by the system.

In some instances, a speechlet 1090 may provide output text data responsive to received NLU results data. The server(s) 120 may include a text-to-speech (TTS) component 1080 that generates output audio data from speechlet provided output text data. The TTS component 1080 may use different synthesis techniques. In one method of synthesis called unit selection, the TTS component 1080 analyzes text data against a database of recorded speech. The TTS component 1080 selects units of recorded speech matching the text data and concatenates the units together to form output audio data. In another method of synthesis called parametric synthesis, the TTS component 1080 varies parameters such as frequency, volume, and noise to create output audio data including an artificial speech waveform. Parametric synthesis uses a computerized voice generator, sometimes called a vocoder.

The server(s) 120 may include a user recognition component 1095. The user recognition component 1095 may take as input the audio data 1011 and/or input text data output by the ASR component 1050. The user recognition component 1095 determines scores indicating whether the speech represented in the audio data 1011 originated from a particular user. For example, a first score may indicate a likelihood that the speech originated from a first user, a second score may indicate a likelihood that the speech originated from a second user, etc. The user recognition component 1095 also determines an overall confidence regarding the accuracy of user recognition operations. The user recognition component 1095 may perform user recognition by comparing audio characteristics in the audio data 1011 to stored audio characteristics of users. The user recognition component 1095 may also perform user recognition by comparing biometric data (e.g., fingerprint data, iris data, etc.) received by the system in correlation with the audio 11 to stored biometric data of users. The user recognition component 1095 may further perform user recognition by comparing image data (e.g., including a representation of at least a feature of a user) received by the system in correlation with the audio 11 with stored image data (e.g., including representations of features of users). The user recognition component 1095 may perform additional user recognition processes, including those known in the art. Output of the user recognition component 1095 may be used to inform NLU processing as well as processing performed by speechlets 1090.

The server(s) 120 may include a user profile storage 1070. The user profile storage 1070 may include a variety of information related to individual users, groups of users, etc. that interact with the system. The user profile storage 1070 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 1070 is implemented as part of the server(s) 120. However, it should be appreciated that the user profile storage 1070 may be in communication with the server(s) 120, for example over the network(s) 199. User profile data may be used to inform NLU processing as well as processing performed by speechlet 1090.

Figure 11:
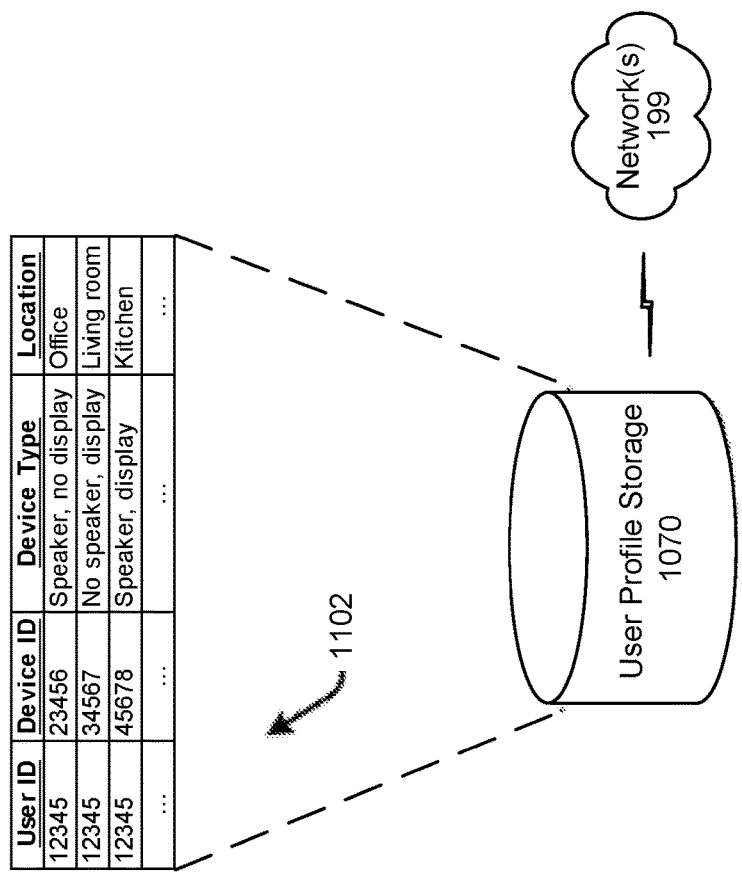
FIG. 11 illustrates data stored and associated with user profiles according to embodiments of the present disclosure.

FIG. 11 illustrates the user profile storage 1070 that includes data regarding customer profiles as well as individual user profiles 1102. Each user profile 1102 may include information indicating various devices, output capabilities of each of the various devices, and a location of each of the various devices. Each user profile 1102 may additionally include other data not explicitly illustrated.

Figure 12:
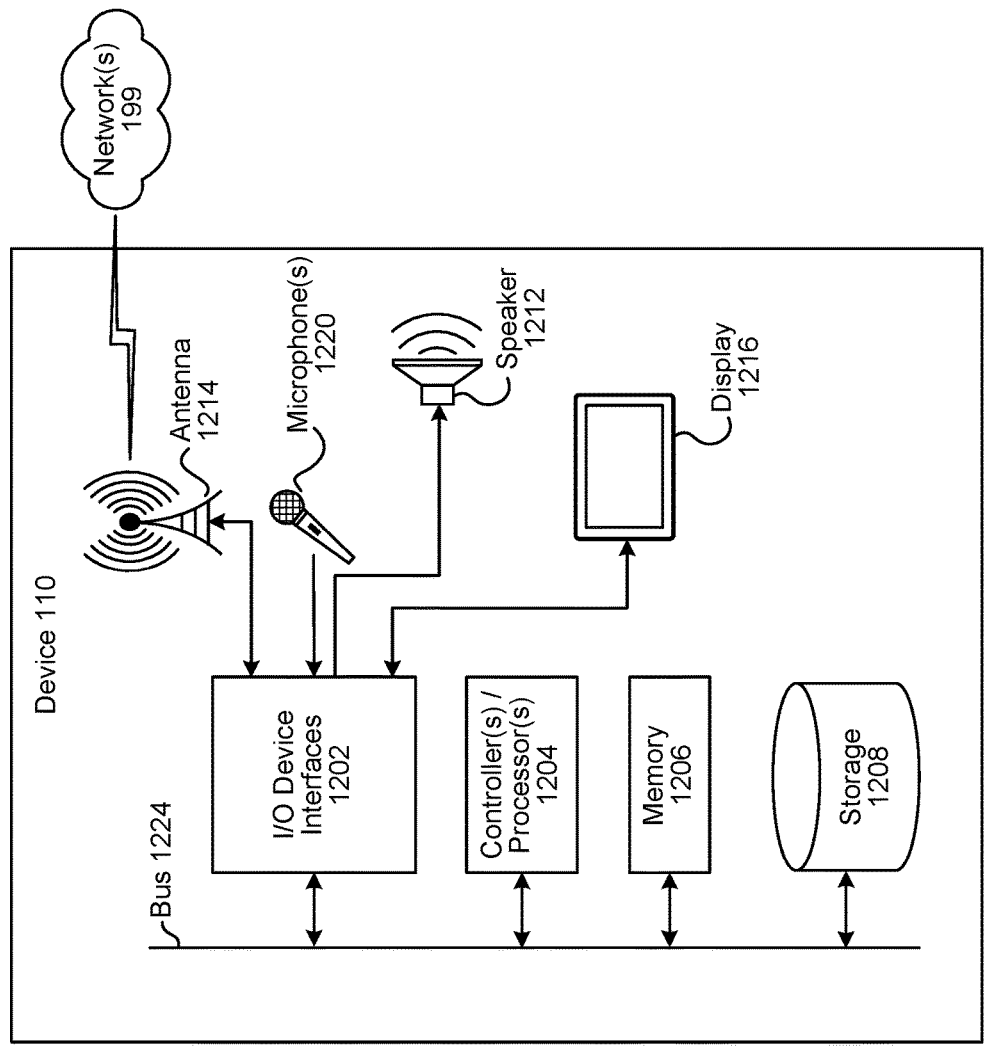
FIG. 12 is a block diagram conceptually illustrating example components of a device according to embodiments of the present disclosure.
Figure 13:
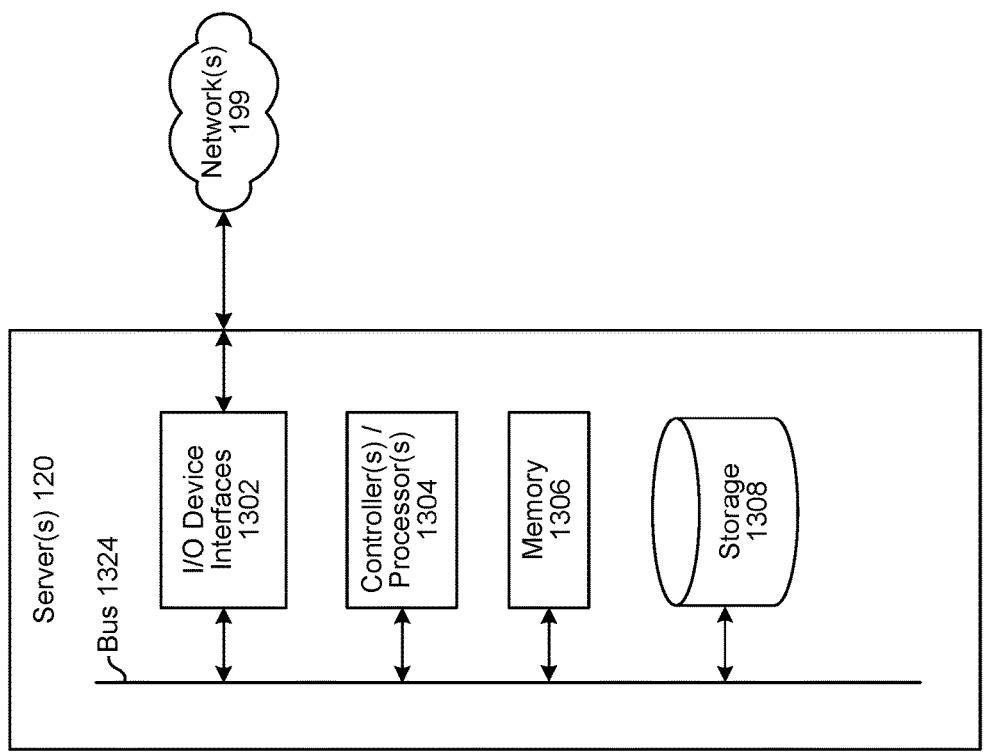
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the server(s) 120, which may assist with ASR processing, NLU processing, etc. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below.

Each device (110/120) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 1212, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. The device 110 may additionally include a display 1216 for visually presenting content.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device 110 and the server(s) 120 may include their own dedicated processors, memory, and/or storage. Alternatively, one or more of the components of the device 110 and the server(s) 120 may utilize the I/O interfaces (1202/1302), processor(s) (1204/1304), memory (1206/1306), and/or storage (1208/1308) of the device 110 and server(s) 120, respectively. Thus, the ASR component 1050 may have its own I/O interface(s), processor(s), memory, and/or storage; the NLU component 1060 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 14:
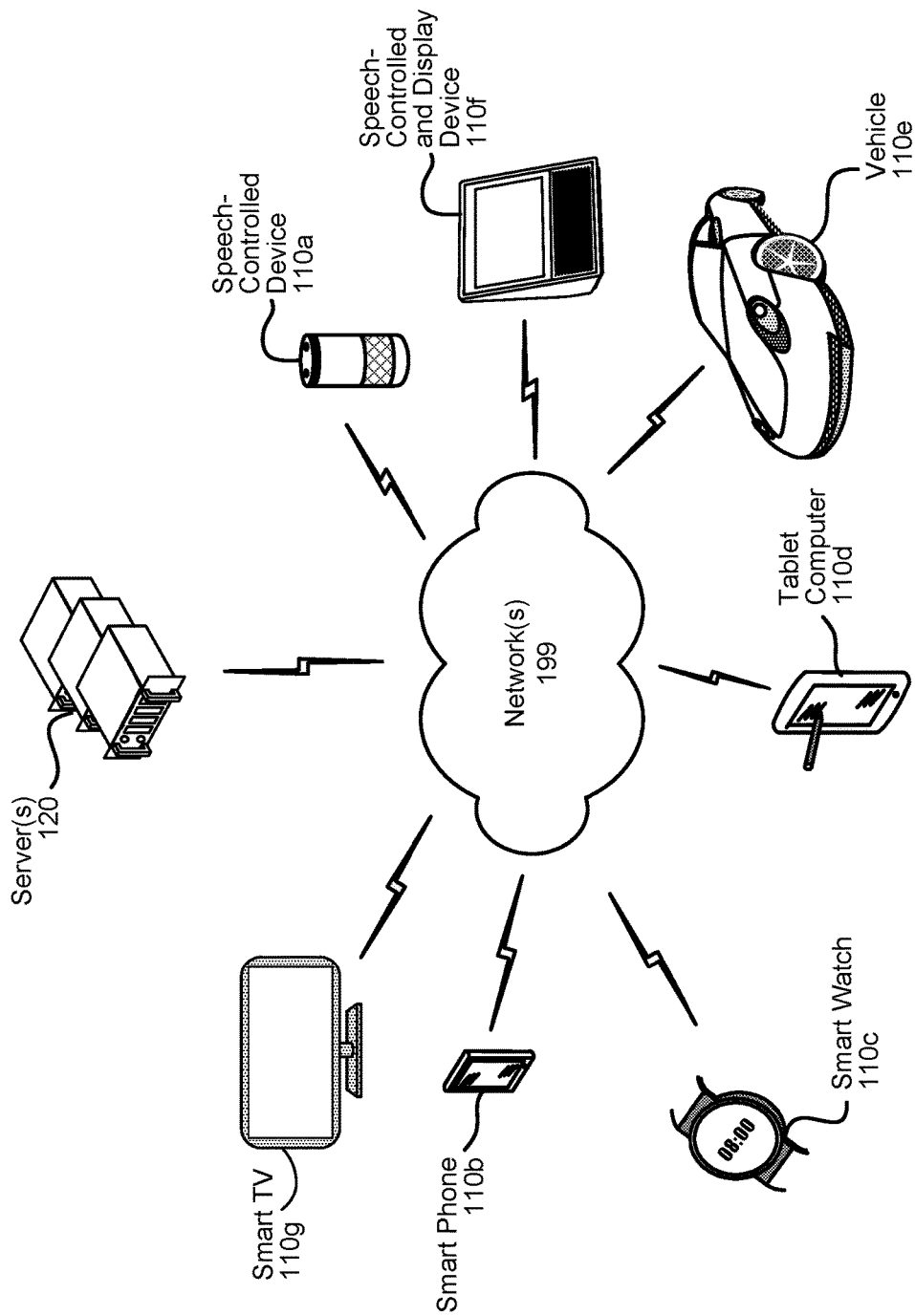
FIG. 14 illustrates an example of a computer network for use with the speech processing system.

As illustrated in FIG. 14, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the server(s) 120, skill server(s) 125, or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device and in response to the device detecting a wakeword in audio using a first wakeword detection threshold value, input audio data corresponding to an utterance;
   performing automatic speech recognition (ASR) on the input audio data to generate input text data;
   performing natural language understanding (NLU) on the input text data to generate NLU results data including intent data;
   determining output data using the NLU results data;

19 based on the intent data, determine the device is to use a second wakeword detection threshold value for a duration of time, the second wakeword detection threshold value being different from the first wakeword detection threshold value;

causing the device to present content corresponding to the output data; and sending, to the device, a command to use the second wakeword detection threshold value during the duration of time.

2. The computer-implemented method of claim 1, further comprising:
   determining device profile data associated with the device;
   determining historical speech processing data associated with the device profile data;
   determining the historical speech processing data includes:
      a first instance when the device received first audio corresponding to the wakeword, and
      a second instance when the device received second audio corresponding to the wakeword;
   determining a duration of time between the first instance and the second instance;
   determining a number of times the duration is represented in the historical speech processing data;
   using the duration of time and number of times, training a model to determine when to use the second wakeword detection threshold value; and
   sending, to the device, the model implementable by a wakeword detection component of the device.

3. The computer-implemented method of claim 1, further comprising:
   receiving, from the device, second input audio data corresponding to a second utterance;
   performing speech processing on the second input audio data to generate speech processing results data;
   sending the speech processing results data to a speechlet component;
   receiving, from the speechlet component, first data indicating the speechlet component cannot process with respect to the speech processing results data; and
   sending, to the device, a second instruction to use the second wakeword detection threshold value.

4. The computer-implemented method of claim 1, further comprising:
   receiving, from the device, second input audio data corresponding to a second utterance;
   failing to perform speech processing, wherein failing to perform speech processing comprises failing to perform at least one of ASR or NLU with respect to the second input audio data;
   generating second output data indicating failure to perform speech processing;
   causing the device to present second content corresponding to the second output data; and
   sending, to the device, a second command to use the second wakeword detection threshold value during the duration of time.

5. A system comprising:
   at least one processor; and
   at least one memory including instructions that, when executed by the at least one processor, cause the system to:
      receive, from a device, input audio data corresponding to an utterance;

20 perform speech processing on the input audio data to generate speech processing results data;
      determine output data using the speech processing results data;
      determine the device is to use a first wakeword detection threshold value after presenting the output data, the first wakeword detection threshold value being different from a second wakeword detection threshold value that was being used by the device when the utterance was received by the device;
      cause the device to present the output data; and
      send, to the device, a command to use the first wakeword detection threshold value.

6. The system of claim 5, wherein the at least one memory further includes instructions that, when executed by the at least one processor, further cause the system to:
   perform automatic speech recognition (ASR) on the input audio data to generate input text data;
   perform natural language understanding (NLU) on the input text data to generate NLU results data including intent data;
   based at least in part on the intent data, determine a future point in time when the first wakeword detection threshold value is to start being used,
   wherein the command indicates the future point in time.

7. The system of claim 5, wherein the at least one memory further includes instructions that, when executed by the at least one processor, further cause the system to:
   determine device profile data associated with the device;
   determine historical speech processing data associated with the device profile data;
   determine the historical speech processing data includes:
      a first instance when the device received first audio corresponding to a wakeword, and
      a second instance when the device received second audio corresponding to the wakeword;
   determine a first duration of time between the first instance and the second instance;
   determine a number of times the first duration is represented in the historical speech processing data;
   use the first duration of time and the number of times to train a model to determine when to use the first wakeword detection threshold value; and
   send, to the device, the model implementable by a wakeword detection component of the device.

8. The system of claim 5, wherein the at least one memory further includes instructions that, when executed by the at least one processor, further cause the system to:
   determine user profile data associated with a first utterance;
   determine historical speech processing data associated with the user profile data;
   determine the historical speech processing data includes:
      a first instance when the device received first audio corresponding to a wakeword, and
      a second instance when the device received second audio corresponding to the wakeword;
   determine a first duration of time between the first instance and the second instance;
   determine a number of times the first duration is represented in the historical speech processing data;
   use the first duration of time and the number of times to train a model to determine when to use the first wakeword detection threshold value;
   determine the user profile data represents a device identifier (ID) associated with the device; and after determining the user profile data represents the device ID, send, to the device, the model implementable by a wakeword detection component of the device.

9. The system of claim 5, wherein the at least one memory further includes instructions that, when executed by the at least one processor, further cause the system to:
   determine user profile data associated with the utterance;
   determine historical speech processing data associated with the user profile data; and
   based at least in part on the historical speech processing data and the speech processing results data, determine a duration of time the device is to use the first wakeword detection threshold value.

10. The system of claim 5, wherein the at least one memory further includes instructions that, when executed by the at least one processor, further cause the system to:
   determine a first time associated with the input audio data, the first time corresponding to when the device received input audio corresponding to the input audio data;
   determine device profile data indicates when the device previously detected a wakeword;
   determine, in the device profile data, that the first time corresponds to a time of day when a subsequent speaking of the wakeword is likely to be detected; and
   based at least in part on determining the first time corresponds to the time of day, determine a duration of time the device is to use the first wakeword detection threshold value.

11. The system of claim 5, wherein the at least one memory further includes instructions that, when executed by the at least one processor, further cause the system to:
   send, to the device, a second command to linearly transition the first wakeword detection threshold value to the second wakeword detection threshold value.

12. The system of claim 5, wherein the at least one memory further includes instructions that, when executed by the at least one processor, further cause the system to:
   receive, from the device, second input audio data corresponding to a second utterance;
   fail to perform speech processing with respect to the second input audio data;
   generate second output data indicating failure to perform speech processing;
   cause the device to present second content corresponding to the second output data; and
   send, to the device, a second command to use the first wakeword detection threshold value.

13. A computer-implemented method comprising:
   receiving, from a device, input audio data corresponding to an utterance;
   performing speech processing on the input audio data to generate speech processing results data;
   determining output data using the speech processing results data;
   determining the device is to use a first wakeword detection threshold value after presenting the output data, the first wakeword detection threshold value being different from a second wakeword detection threshold value that was being used by the device when the utterance was received by the device;
   causing the device to present the output data; and
   sending, to the device, a command to use the first wakeword detection threshold value.

14. The computer-implemented method of claim 13, further comprising performing automatic speech recognition (ASR) on the input audio data to generate input text data;
   performing natural language understanding (NLU) on the input text data to generate NLU results data including intent data;
   based at least in part on the intent data, determining a future point in time when the first wakeword detection threshold value is to start being used,
   wherein the command indicates the future point in time.

15. The computer-implemented method of claim 13, further comprising:
   determining device profile data associated with the device;
   determining historical speech processing data associated with the device profile data;
   determining the historical speech processing data includes:
      a first instance when the device received first audio corresponding to a wakeword, and
      a second instance when the device received second audio corresponding to the wakeword;
   determining a first duration of time between the first instance and the second instance;
   determining a number of times the first duration is represented in the historical speech processing data;
   using the first duration of time and the number of times to train a model to determine when to use the first wakeword detection threshold value; and
   sending, to the device, the model implementable by a wakeword detection component of the device.

16. The computer-implemented method of claim 13, further comprising:
   determining user profile data associated with a first utterance;
   determining historical speech processing data associated with the user profile data;
   determining the historical speech processing data includes:
      a first instance when the device received first audio corresponding to a wakeword, and
      a second instance when the device received second audio corresponding to the wakeword;
   determining a first duration of time between the first instance and the second instance;
   determining a number of times the first duration is represented in the historical speech processing data;
   using the first duration of time and the number of times to train a model to determine when to use the first wakeword detection threshold value;
   determining the user profile data represents a device identifier (ID) associated with the device; and
   after determining the user profile data represents the device ID, sending, to the device, the model implementable by a wakeword detection component of the device.

17. The computer-implemented method of claim 13, further comprising:
   determining user profile data associated with the utterance;
   determining historical speech processing data associated with the user profile data; and
   based at least in part on the historical speech processing data and the speech processing results data, determining a duration of time the device is to use the first wakeword detection threshold value.

18. The computer-implemented method of claim 13, further comprising:

determining a first time associated with the input audio data, the first time corresponding to when the device received input audio corresponding to the input audio data;

determining device profile data indicates when the device previously detected a wakeword;

determining, in the device profile data, the first time corresponds to a time of day when a subsequent speaking of the wakeword is likely to be detected; and based at least in part on determining the first time corresponds to the time of day, determine a duration of time the device is to use the first wakeword detection threshold value.

19. The computer-implemented method of claim 13, further comprising:

sending, to the device, a second command to linearly transition the first wakeword detection threshold value to the second wakeword detection threshold value.

20. The computer-implemented method of claim 13, further comprising:

receiving, from the device, second input audio data corresponding to a second utterance;

failing to perform speech processing with respect to the second input audio data;

generating second output data indicating failure to perform speech processing;

causing the device to present second content corresponding to the second output data; and sending, to the device, a second command to use the first wakeword detection threshold value.

* * * * *